United States Patent Office 3,708,400
Patented Jan. 2, 1973

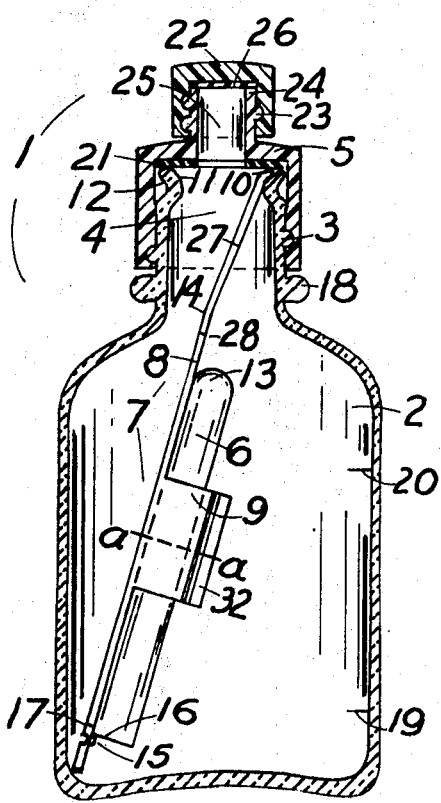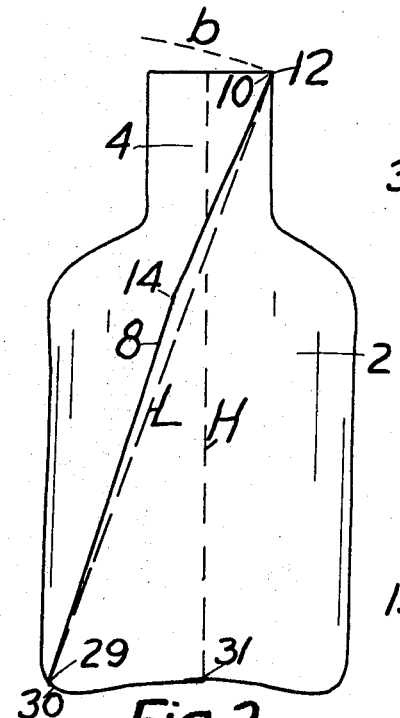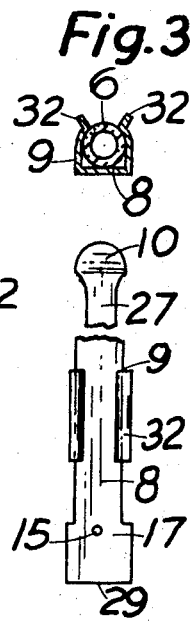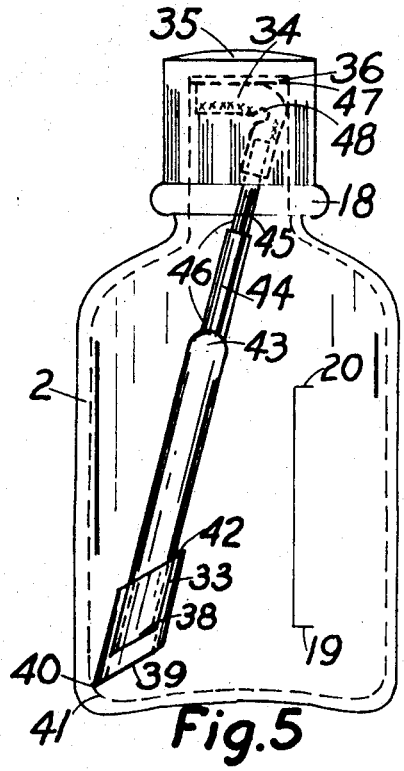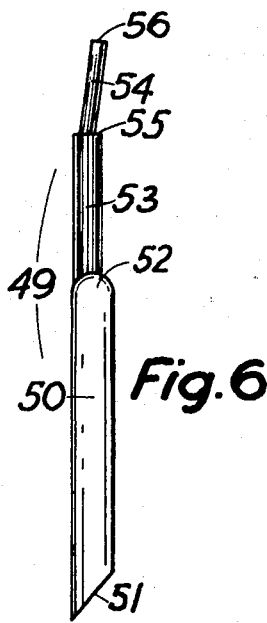

3,708,400
SAMPLER-CULTURE APPARATUS FOR THE DETECTION OF COLIFORM BACTERIA IN POTABLE WATERS
Abraham Adler Hirsch, 141 Norwood St., Shreveport, La. 71105
Filed Nov. 17, 1971, Ser. No. 199,648
Int. Cl. C12k 1/04, 1/10
U.S. Cl. 195—127
11 Claims

ABSTRACT OF THE DISCLOSURE

A go-no-go gage to determine directly whether bacterial quality of a drinking water sample meets the U.S. Public Health Service Standards in which all laboratory manipulations are eliminated from sampling to gas observation. The apparatus is creep-proof; it avoids exposures and the operations are precise. Gas from fermentation shows in a Durham vial held diagonally in a screw cap bottle either by being clamped in a cage or by a tailrod, both methods eliminating all axial and lateral motion. A confirmatory Brilliant Green Bile broth tube is seeded by pressing into the screw cap and inverting, thus obviating all extraneous utensils throughout the procedure.

---

This invention consists of improvements in a specialized apparatus for determining the presence of coliform bacteria in potable waters, certain raw reservoir waters, shellfish beds, and in other aqueous environments in which low density of these bacteria is hygienically imperative.

The sanitary quality of waters intended for drinking and other uses involving bodily contact is determined by the density of coliform organisms. The standard established by the U.S. Public Health Service for culinary water supplies used in interstate commerce limits the concentration of coliform bacteria not to exceed 1 bacterium per 100 ml. of sample. This same value is observed nationwide for all public water supplies. For other quality water usages, such as in swimming pools, outdoor recreational areas and shellfish beds, the various states have set their own limiting coliform densities.

A specialized container-culture vessel to simplify the technique involved in the broth fermentation test for coliform bacteria has been described in U.S. Pat. 3,474,003.

NEED FOR IMPROVEMENT

Experience with the use of this device has indicated certain disadvantages; these include: creeping of the liquid mixture through the ground glass joint of the wide mouth stopper due to the presence of surfactant in the broth formula, imperfect control of the stance of the caged, inverted vial as the container is inverted during a test, thereby requiring several manipulations, the necessity of marking both bottle and stopper to identify the ground-in pair for use together only, the impaired visibility at the top of the vial, and the difficulty in forming the complicated cage as there illustrated. Further disadvantages are the chores required for registering the hole of the skirted ground glass stopper with that in the neck of the bottle before sterilization; also twisting this stopper to block this opening after cooling, and again a final need for attention to make sure that the holes do not meet subsequently after sampling.

Whenever the water sample is quite cold the culture mixture is subject to a false positive test caused by release of dissolved air and other gases at incubation temperature. Such bubbles cannot safely be removed from the Durham vial in wide mouth ground glass stoppered bottles by later inversions due to the creeping of liquid through the large diameter ground glass joint and consequent danger of contamination. Therefore, a positive show of gas formation becomes questionable under these circumstances.

OBJECTS

The first set of objects of the subject invention is to eliminate these flaws of the cited apparatus by providing a closure that is proof against creeping, one that is truly interchangeable between containers, one that avoids perforations in the stopper and in the neck of the bottle thereby eliminating the details involved in matching and mis-matching the vent hole, and a cage or fixture that permits better visibility of the vial and is mounted substantially steady for perfect control of fillage on a single inversion. This feature of positive fillage on inversions is highly important because it precludes errors caused by carelessness of non-technical operators.

An additional object is to provide in connection with the closure an easy positive means to inoculate a confirmatory broth test container without need for further laboratory utensils.

Another objective is to simplify the apparatus for fabrication. A further object of this invention is to permit a wider range in the choice of materials and construction of the inverted vial and its means for retention. A still further object is to adapt the vial holder to present only minimum interference with the introduction of the water sample, as the wide strip and the U-turn on top of the cage of Pat. 3,474,003 would block the narrower closure herein proposed. An additional object is to define and to apply the geometry of the apparatus for complete control of liquid expulsion and refill of the inverted vial, and to eliminate all free play of the vial assembly when the bottle is closed.

A further object of this invention is to describe techniques for freeing the apparatus of dissolved gases that interfere with interpretation of the primary test for coliforms and to describe techniques for inoculating confirmatory broths with liquid from a positive primary test without use or need for extraneous utensils.

SUMMARY

These objectives are achieved by using a bottle having a screw cap with a gasketed fit over its mouth, by reforming the shape of the cage for the inverted vial, or by eliminating the cage entirely, and by observing a geometric requirement that the length of a rigid supporting cage be greater than the inside vertical height of the bottle but less than the diagonal distance from the bottom corner to the opposite tip of the mouth. The cage can also be restrained by means of an elastic, flexed top or by compression of slightly yielding plastic composition of its entire structure. Entrapped dissolved gases from cold samples is released by a secondary inversion after the culture has approached incubation temperature.

The provision for a secondary broth inoculation consists in topping the closure with an auxiliary pony screw cap which on interchange with that of a secondary broth container and inverting implants a small portion of the fermented primary mixture. Procedure for a secondary implant using only a plain screw cap consists in pushing the top of a confirmatory broth tube tightly against the gasket therein and inverting.

REFERENCE TO THE DRAWING

The structural details of this invention are illustrated in the drawing in which:

FIG. 1 is a vertical section of the sampler-culture bottle for coliforms fitted with a compound cap and showing the caged vial assembly in elevation, FIG. 2 is a diagram to establish the geometry for the overall length of a rigid cage to enable complete control, FIG. 3 is a cross-section across the cage and vial along axis a—a of FIG. 1, FIG. 4 is an outline in elevation of the cage of FIG. 1, FIG. 5 is an elevation of a coliform sampler-culture bottle containing an inverted vial without a cage but positioned by elastic tubing at the top of an upstanding tail and an elastic sleeve at the bottom, and FIG. 6 is an elevation of a transparent, upwardly tailed, inverted plastic vial which obviates a cage.

SEPARATE VIEWS

Discussion is now directed to the separate views in turn. A given identification numeral signifies the same part or element throughout the drawing.

Referring to FIG. 1: The container of the sampler-culture apparatus 1 consists of a transparent bottle 2, usually of glass, having screw threads 3 outside its narrow mouth 4 to receive a screw cap 5. An inverted vial 6, known as a Durham vial, is held to a cage assembly 7 extending obliquely the inside height of the bottle. The cage assembly comprises a spine 8, which is the supporting element, and jaws 9 for elastically clasping the Durham vial 6. A lip 10 at the top of the spine overhangs the inside arc 11 of the pouring spout 12.

Above the butt 13 of the vial is a slight bend 14 in the spine to localize its deflection and to stabilize the stance of the cage assembly. Near the bottom of the almost rigid spine 8 is a pimple 15 to prevent downward slippage of the vial and to set the lowest position of the vial mouth 16 so as to avoid possibility of glass-to-glass contact and to assure a liberal space for entry of bacteria. A spade-like widening 17 at the bottom of spine 8 further protects the bottom of the vial from striking the bottle.

Outside the bottle collar 18 is a conventional detail for strength; it serves no functional application here. Sribed on the surface of the bottle are marks 19 and 20 to denote levels for media volume and total volume with sample, respectively. In the usaul case, these graduations are for 20 ml. of media and 100 ml. of sample. An annular gasket 21 under the top of cap 5 makes closure of the bottle certain. A pony cap 22 screws onto the threads 23 of a lug 24 extending atop the main cap 5. The mouth of the pony passage 25 is covered liquid-tight by gasket 26. Both gaskets, 21 and 26, are biologically inert.

In the upper segment 27 of spine 8, at the level starting slightly below the mouth 4 of the bottle, indents 28 on both sides narrow its width in order to reduce inflow obstructive area to a minimum when filling the bottle with sample. The curved lip need not be so narrowed as it lies against the inside surface of the mouth 4 out of line of inflow of sample.

FIG. 2 shows diagrammatically the fundamental geometrical relationships which must be recognized to obtain complete control of the stance of a caged vial held to a rigid spine. This control is necessary in order to insure that the Durham vial is thoroughly emptied the first time the apparatus is inverted and entirely filled on the second inversion. More than a single manipulation to accomplish any given act is undesirable, inefficient, and conducive to error.

The bottom tip 29 of spine 8 sets at the inside bottom corner 30 of bottle 2; the spine extends to the top of the spout 12. The straight line length or reach of the spine is denoted by dashed line L. The internal height of the bottle from the bottom center 31 to the plane of the spout 12 is shown as dashed line H. Obviously, in order to be contained within the bottle with cap in place and enable assured control of stance, length L must exceed height H, else the cage assembly would wobble on inversion, also length L must be equal to or less than the distance between points 30 and 12 in order for the cap 5 to seat. Using point 30 as a pivot, arc b shows the path a full length spine would follow when moving from contact with the spout. Clearly it is constrained by the cap to remain positioned as shown.

The foregoing discussion presupposes an obsolutely rigid spine. Actually there is some columnar deflection with metallic strips and with semi-rigid materials, hence for these the length of spine L may slightly exceed the distance between points 30 and 12 and become flexed on closure. In consequence of such a flexure the cage assembly is held even more firmly than described above. Also contributing to elastic constraint is the nature of gasket 21. When this is rubber or a similar elastomer an almost rigid spine having length L slightly exceeding the distance between points 30 and 12 will be accommodated in diagonal posture.

FIG. 3, a section along line a—a of FIG. 1, shows the method for securing the inverted vial 6 within the jaws 9 of the cage assembly 7 and the manner of forming these jaws from the stock of spine 8. The vial is inserted and pushed home against the run of the spine by first forcing open the outwardly spreading lips 32 of clamp 9.

FIG. 4, a frontal elevation of the spine of FIG. 1, shows the widening at the bottom to form a spade-like flare 17 which protects the edges of the inverted vial. Pimple 15 delimits the lowest position of the vial and also prevents its slippage downward, although the jaws 9 grasp the vial with sufficient tenacity. The upper segment 27, below lip 10 is narrower than the portion adjoining the jaws. The indent 28, as shown in FIG. 1, begins slightly below the angulation 14.

FIG. 5 illustrates a spinelss version of an inverted tailed vial assembly, consisting entirely of glass, or similar transparent material, protected against glass-to-glass contact on the bottom by an obliquely cut transparent elastic sleeve 33, made of Tygon or the equivalent, and on the top by a gum rubber tubing 34.

Bottle 2 is covered by a conventional screw cap 35, inside the top of which is gasket 36. The Durham vial 37 is cut obliquely at its open bottom 38 to provide maximum entry area for bacteria. Similarly, the Tygon sleeve 33 is cut obliquely at its bottom 39 approximately parallel to the mouth of the tube. The corner of the sleeve 40 rests on the inside corner 41 of the bottle. The top 42 of sleeve 33 likewise is cut obliquely but for the reason to permit unconfused identification of a bubble of gas at this level. If this cut were horizontal there is a possibility of masking the meniscus at the gas-liquid interface, and thus vitiating a test.

Above the butt 43 of the vial is fused an intermediate tail-rod 44; on top of this is fused a more slender top tail-rod 45. A piece of gum rubber tubing 34 is pushed over the slender upper segment 45 of the tailpiece 46. The vial and tail-piece fit diagonally into the bottle, extending from the lower corner 41 to the gasket 36. The diameter of the tail-piece is stepped down to the smallest diameter at the top portion 45 to permit fit by a relatively small bore of thin walled tubing 34 so as to minimize the obstruction of influx of sample. The upper tip of the tail-piece tubing 36 may extend at its top either to the edge of the mouth 47, as with the cage of FIG. 1, or have a greater length, for convenience not to exceed the diameter of the mouth minus about a tubing diameter, in order to fold under the gasket, usually with a kink 48 at the bend. The rubber tubing 34 completely prevents loose play of the vial and tail-piece when stopper 35 is fully screwed in place. Elasticity of the rubber tube 34 also holds the stopper in engagement with the threads on the bottle when the cap is slightly loosened for maintenance of aerobic conditions.

FIG. 6 shows an inverted vial-tailpiece assembly 49 consisting entirely of polycarbonate resin or other autoclavable, transparent, stiff plastic. Inverted vial 50 has an oblique bottom opening 51. Atop its butt 52 is an intermediate tailpiece or extension rod 53 which terminates in a thinner top tail rod 54. The juncture 55 of these rod segments is at a slight angle to promote deflection when the assembly 49 is confined inside a closed bottle 2. The middle segment 53 is axially parallel with vial 50 but set eccentrically on top so that inside a bottle its center of gravity tends to rotate the open end 51 facing the inside of the bottle. The tailed vial assembly 49 is mounted diagonally inside a bottle with the bottom of its angled opening 51 resting in a corner 41 and the upper tip 56 of the tail top reaching the edge of the mouth 47, according to the principles of FIG. 2. Actually the overall length L may be slightly exceeded in which case the elasticity of the plastic causes deflection at joint 55 without impairment.

METHOD OF USE

This sampler-culture bottle is intended essentially to facilitate the examination of potable waters and samples for which high bacterial quality is routinely expected. Primarily, it shows at once whether a water sample meets the U.S. Public Health Service Standard not to exceed one coliform bacterium per 100 ml. It is simply a go-no-go gage and is definitely not a counting device. Procedure for detection of coliforms by the fermentation method is divided into two steps: the primary or presumptive test in a selective medium which permits enrichment and presumptive indication of this group, and the confirmatory test in an inhibitory medium which rules out interfering organisms that may have passed through the primary test.

PRESUMPTIVE TEST

Preferred procedure with the sampler-culture apparatus for this step is as follows:

PREPARATION

Place 4.3 grams of dehydrated Lauryl Tryptose Broth into the sampler-culture bottle and add distilled or demineralized water to the 20 ml. mark. Insert the caged or tailed vial into the bottle with the open end down. With the cap resting in place unscrewed autoclave the bottle and contents at 15 p.s.i. for 15 minutes. On releasing pressure and cooling, liquid will ascend the inverted vial. Tighten the screw cap.

SAMPLING

Sterilize the faucet or other discharge fitting by allowing it to flow full to waste for five minutes. Hold the sampler-culture bottle horizontal to empty the upturned vial. Set upright again and carefully remove the screw cap, keeping the interior sterile. Draw water sample into the bottle up to the upper or 120 ml. mark. Replace the screw cap tightly and *twirl*—avoid vertical shaking which causes froth, until the contents are thoroughly mixed. Allow the unit to set for several minutes for bubbles to surface. Invert the bottle—for best results in the plane of the vial to fill it with liquid. Only a single such inversion is required for complete displacement of air from the vial. Set the bottle upright and inspect the vial to be sure its butt is free of bubbles. Repeat the inversion step if necessary.

INCUBATION

If the temperature of the sample is quite cold it is likely to contain dissolved air and other gases well in excess of solubility at incubator temperature. To avoid a false show of gas in the vial allow the sample sufficient time, several hours if necessary, to reach surrounding temperature. Preliminary immersion in a water bath will be effective. If bubbles do collect in the butt, invert the bottle again to permit them to escape.

Unscrew the cap about one-half turn to allow aerobic conditions. Incubate at 35° C. and observe the vial for presence of gas after 24 and 48 hours, or more frequently if indicated.

INTERPRETATION

Any show of gas within 48 hours indicates the presumptive presence of coliform bacteria. Actually, positive tests have been found due to coliform organisms in about 95% of the examinations making further tests for confirmation a formality in most cases.

Since a positive test means that at least one coliform bacterium is present in the 100 ml. sample, it is statistically unlikely that their concentration is exactly 1.00 per 100 ml.; therefore a positive test indicates failure to meet the U.S. Public Health Service Standards for drinking water. Such samples call for reexamination and possible sanitary or engineering action.

CONFIRMED TEST

If the presumptive test is positive, screw the cap tightly on the sampler-culture bottle, invert it to wet the gasket with the fermented culture and set the bottle upright again. If a compound stopper is used, as in FIG. 1, exchange the pony cap with a similar one screwed on a vial containing sterile Brilliant Green Bile Broth and a miniature Durham vial to note secondmary gas formation. Pony caps and secondary broth vial caps can be color coded to avoid confusion regarding completion of a transfer. Tilt the secondary vial to complete the transfer of the inoculum.

If an ordinary screw cap is on the sampler-culture bottle, as in FIG. 5, remove the cap, lower it, without screwing, over the mouth of the test tube containing Brilliant Green Bile Broth, holding the pair together so as to press tightly against the gasket, and invert to inoculate the secondary broth. The cap may remain loosely over the confirmatory tube as a cover.

Incubate at 35° C. up to 48 hours for growth of total coliforms. A similar test for fecal coliforms can be run simultaneously inoculating as before but using EC Broth as the confirmation medium and incubating at 44½° C. for 24 hours. A show of gas in either case is a positive test.

GENERALIZATIONS

Optimum structure for the apparatus has been described but variations and reasonable departures therefrom will still perform satisfactorily and are included within the scope of this invention and its claims. All materials employed in the construction of the caged vial assembly or the tailed vial should be unaffected by the conditions of exposure and be biologically inert.

Although a deeply skirted screw cap and a lipped pouring spout is illustrated in FIG. 1, a conventional screw cap is satisfactory. The top of the spine of the caged vial assembly may have any sort of end instead of the lip as shown, provided its continued pressure on the gasket is not damaging. Other means for clamping the vial to the spine, without interference with observations for gassing, is contemplated but these do not stray from the basic principles stated in the description and the claims. Features of the spine may likewise be varied but the basic requirements still adhere. Thus the angulation above the vial may be either eliminated or increased. An increase is desirable when a smaller volume of sample is to be tested. In this case a smaller Durham tube is selected and it is positioned closer to the side of the bottle. When inverted the liquid can then completely fill the vial without leaving an air space.

In the case of the tailed Durham vial various modifications are conceived such as the method of attachment of the tail to the butt of the vial, degree of eccentricity of the tail, length of tail, choice of part of bottle for the elastic tubing to engage for positioning, and other features, but all of these are based on the fundamental structures as disclosed in the text and stated in the claims.

I claim:

1. A combination sampler-culture apparatus for the detection of coliform bacteria in drinking water supplies comprising
   a transparent bottle of autoclavable material having a relatively narrow mouth compared to the body thereof, a screw cap thereon, a gasket between said screw cap and the top of said bottle, an inverted vial inside said bottle having an upstanding, tail extending axially lengthwise from the butt thereof, a flexible tubing incasing the top portion of said tail to engage the underside of said screw cap, said vial with said tail assuming an oblique stance diagonally across said bottle, fixidness of position of said vial and tail being obtained by flexing said tubing against said screw cap.

2. The apparatus of claim 1 in which a protective sleeve incases the open end of said vial and rests near the bottom corner inside said bottle.

3. The claim 2 in which said protective sleeve is transparent.

4. The apparatus of claim 2 in which the top and the bottom edges of said protective sleeves are cut obliquely to the stance of said inverted vial.

5. The apparatus of claim 1 in which said upstanding tail above the butt of said inverted vial is a rod consisting of two segments, the upper segment being of smaller diameter so that a flexible tubing of relatively small bore and wall thickness can fit thereon.

6. The apparatus of claim 1 in which said tail is mounted eccentrically on said butt of said inverted vial.

7. A combination sampler-culture apparatus for detecting the presence of coliform bacteria in drinking water supplies comprising a a bottle of transparent, autoclavable material with a screw cap thereon, said bottle having a relatively narrow mouth compared to the body thereof, said bottle containing an inverted vial of clear transparent, autoclavable, semi-rigid plastic material, a tailpiece of like material extending axially upward from the butt of said vial to engage the underside of said screw cap, said vial with said tail being retained diagonally within the body of said bottle, extending from near the bottom corner thereof to the top of the mouth thereof across a body diagonal therein.

8. The apparatus of claim 7 in which said tailpiece is attached eccentrically to the butt of said vial.

9. The apparatus of claim 7 in which said tailpiece consists of two segments, the upper segment being of reduced diameter so as to minimize obstruction to entry of a water sample into said bottle.

10. The apparatus of claim 7 in which an angle is formed at the junction of said segments of said tailpiece so as to promote its flexure when said screw cap is tightened.

11. The apparatus of claim 7 in which the bottom of said vial is cut obliquely to its long axis in order to offer large surface of contact between culture liquid outside and inside of said inverted vial.

References Cited
UNITED STATES PATENTS
3,474,003  10/1969  Hirsch _____ 195—127

A. LOUIS MONACELL, Primary Examiner

R. J. WARDEN, Assistant Examiner